July 13, 1954 G. L. MATHESON 2,683,685
ELUTRIATION OF FINELY DIVIDED SOLIDS
Filed July 28, 1951
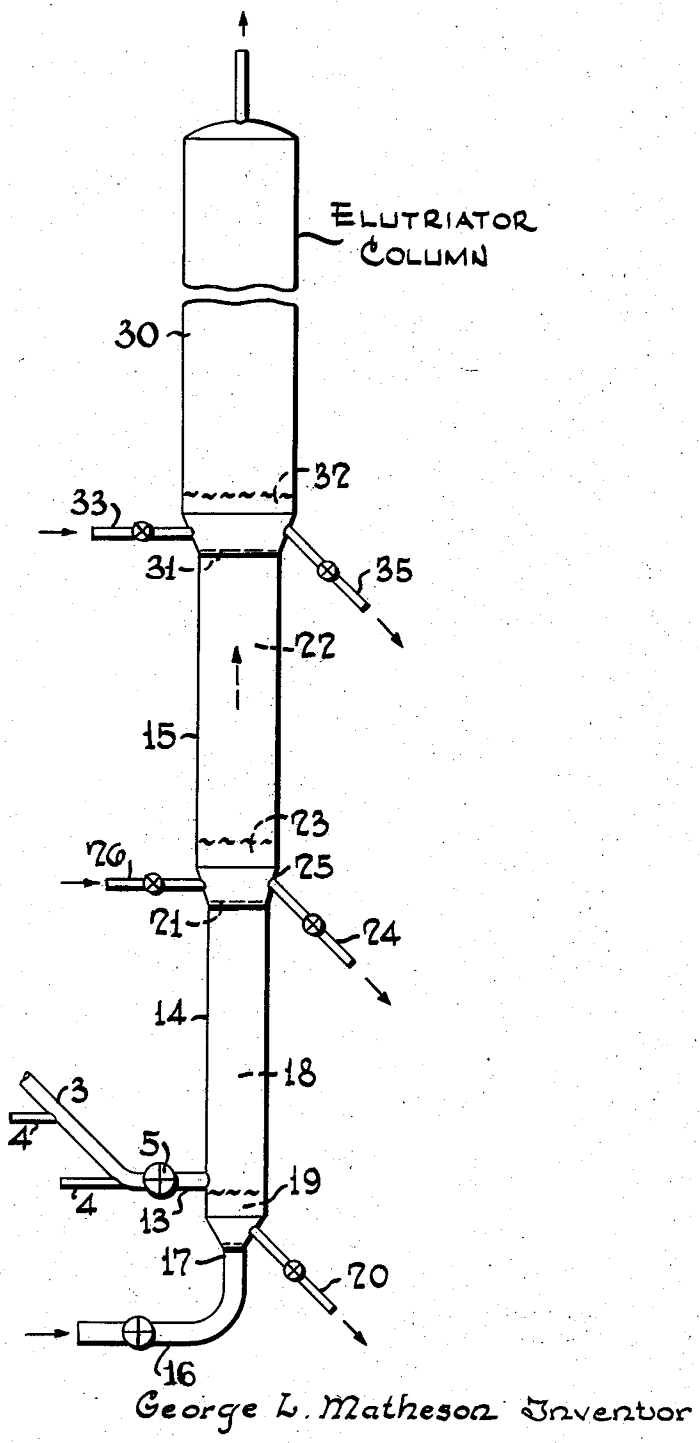
George L. Matheson Inventor
By George J. Gilhooley [signature] Attorney Patented July 13, 1954 2,683,685

UNITED STATES PATENT OFFICE 2,683,685

ELUTRIATION OF FINELY DIVIDED SOLIDS

George L. Matheson, Summit, N. J., assignor to Standard Oil Development Company, a corporation of Delaware Application July 28, 1951, Serial No. 239,160

8 Claims. (Cl. 196—52)

1

This invention relates to a method of separating finely divided solid materials. More particularly it relates to a modification of the method commonly known as air classification and has particular reference to a rapid method for obtaining the sharp separation of fine powders in the sub-sieve and fine sieve size ranges. This application is a continuation-in-part of my previous application Serial No. 165,307, filed May 31, 1950, on "A Process for Improving the Quality of Spent Adsorbents."

The method of air classification, or elutriation with a gas stream, is commonly employed in various industries for removing fine dust particles from powdered or ground materials. Extremely fine particles formed in the course of crushing or grinding operations present special problems in a number of industries, both with regard to the loss of material in subsequent handling and various hazards caused by the presense of dusts in high concentration in the atmosphere. Experience has shown that relatively simple methods may be employed to separate such extremely fine dusts from the coarse particles present, and such methods are frequently grouped together under the title of elutriation.

A common characteristic of such methods has been the requirement that the dusty material to be treated should be combined with the least possible amount of air or other entraining gas, and passed to a settler or other apparatus for dust recovery. The separations obtained in such simple apparatus depend upon gross differences in particle size. These differences may be characterized by the fact that most industrial dusts are in the "sub-sieve" size range, from about 0.2 to 2 microns in diameter, whereas the smallest sieve size used for mechanical separation of ground solid materials is a 400 mesh screen corresponding to a minimum particle diameter of about 34 microns.

In a special application, suitable for laboratory use only, the air classification method has also been modified to obtain a sharper separation of fine particle sizes by observing critically limited operating conditions of gas velocity and particle feed as described by Roller in U. S. Patent 2,019,507, and used in the Roller analyzer. The basis of separation here is the provision of extremely low gas velocities, capable of supporting only particles smaller than a given size. These are characterized, for example, by air velocities such as 0.013 ft. per second for separating particles smaller than 10 microns in diameter from a mixed powder, or velocities of 0.052 ft. per second

2 for particles smaller than 20 microns. In this procedure the "terminal velocity" or velocity of free fall in air for the individual small particle is the sole factor determining the fractionation obtained. The technique has been used almost entirely for the determination of particle size distributions, since it takes much time and air, for example to fractionate a sample as large as 10 grams.

The sharp separation of fine powders by elutriation at reasonable rates has been impossible heretofore. The dust separating methods that are commonly employed in industry are dependent upon very large differences in particle size. While they use high dust loadings, there is no sharp separation according to size within the fine size range. On the other hand, the analytical technique depending upon the close control of low gas velocities gives an extremely low concentration of particles in the gas stream, less than about 0.0001 lb. per cu. ft. of air. Such a low air rate and low solid loading of the gas stream makes this process prohibitive for anything but analytical work.

I have now found that under special circumstances very sharp separations of finely divided powders can be achieved at high velocities, much higher than the terminal velocities of the particles concerned. The use of such high velocities gives a marked increase in the solids loading obtained, and permits sharp separations to be obtained at a useful rate.

It is an object of my invention to separate finely divided powders of random size distribution into sharp cuts of narrow size range.

It is a further object to provide a method of separating sharp fractions according to particle size from a finely divided powder, consisting of particles which are so small as to be difficult or impossible to separate by sieving.

It is a still further object to provide a means for the rapid separation of such fractions from a finely divided solid.

The process of my invention employs a fluidized bed of finely divided solid maintained at the base of a tall, narrow elutriation column, as will be described more fully below. Several such beds may be superimposed one on top of another, with suitably arranged gas velocities in each section so that particles of different size ranges may be simultaneously recovered from a given powder feed to the system.

As indicated above, commercial elutriation processes have heretofore been operated on the commonly accepted principle that the material to be separated should be combined with the least possible amount of air. It has also been assumed that the separation obtained is based on the provision of velocities capable of supporting only particles smaller than a given size.

I have now found, contrary to both of these accepted principles, that effective and sharp separation of powders may be obtained at high velocities, much above the terminal velocity of the various individual particles concerned. This is based upon a distinct fractionating effect which I obtain, in the disperse phase of the solid particles entrained above a fluid bed of solid, by providing for this fractionation a very tall column above the fluid bed level or interface and returning to the fluid bed only those particles which separate out within this zone as a reflux of solids.

According to my process a sharp separation can be achieved at high velocities of the order of 30 times those employed in the Roller apparatus, provided that a very high settling zone is employed. At the same time, and most advantageously, the powder concentration in the air is increased more than 100 fold. Without making any attempt to explain the phenomenon observed, it is particularly significant that my process operates at gas velocities which are substantially above the velocity of free fall of both the fine particles and coarse particles present, yet the latter are selectively rejected as the air or other entraining gas used passes up the column.

In the simplest case the particles in the solid being separated have all substantially the same density, and air elutriation operates to separate strictly according to particle size. Assuming such a solid, the process of my invention will be described specifically with reference to the apparatus illustrated diagrammatically in the attached drawing.

The solids to be separated are introduced into the system preferably in a freely flowing fluidized condition, as by way of a standpipe 3. The mobility of this stream of solids is maintained with the aid of a small amount of gas introduced through aeration taps 4, and the rate of solids flow is controlled by means of valve 5. The flow of solids thus regulated is introduced as a side stream 13 into the bottom portion 14 of a long, vertically arranged elutriation tower 15, and a stream of air or other suitable gas is passed through line 16 into the bottom of the elutriation tower 15 to act as a supporting medium for the elutriation. This gas may be introduced below a dispersion plate 17 at the bottom of tower 15.

The total rate of gas introduced relative to the rate of solids introduced into the bottom of the elutriation tower is controlled so as to give the desired percentage of bottoms or coarsest particles remaining in the lowest section 14 of the elutriator. The percentage of the material to be removed as bottoms at this stage of the process depends entirely upon the character of the solid and the separation to be effected. This bottom section serves to reject that portion of the solids fed which are larger or heavier than the particle size range where the first separation is to be effected. The bottoms fraction, therefore, may contain anywhere from the major portion of the original feed stock to a minor fraction thereof, depending upon whether the separation desired is within the size range of the smallest particles or the largest particles of the original solid feed.

In any case, the velocity at this point is chosen and controlled so as to effectively entrain out of the solids fed a thin suspension or disperse phase 18 including the largest particles to be separated from the bottoms fraction, along with all the smaller particles present. At this velocity the over-size particles comprising the bottoms fraction remain as a fluidized bed 19, resting on the dispersion plate 17 at the bottom of the tower, where they are drawn off through valve 20 as a finished product fraction or for further separation as may be desired.

The lighter particles to be removed overhead from section 14 by the elutriation process are entrained in the gas stream at this velocity, and carried on up through the disperse phase section 18 which serves as a fractionating zone. At the bottom of this section 18 just above the fluid bed 19 the solid particles entrained within the disperse phase contain a significant proportion of the larger particles which it is desired to reject into the bottoms fraction. However, as the particles progress upward through the fractionating zone, the proportion of these over-size particles in the solids entrained at a given level become progressively less.

The supporting and entraining gas employed in the operation may ordinarily be air. However, the operation of the process is not dependent upon the nature of this gas, and in other cases it may be more convenient to use an inert or a chemically reactive gas in order to maintain a desired special atmosphere for handling solids. Likewise, the aerating gas introduced through taps 4 will ordinarily be air but an inert gas or a chemically reactive gas may be employed at this point if desired.

The height of the disperse phase fractionating zone 18, sometimes referred to as "outage" with respect to the difference between the level of the fluid bed and the exit for the gas stream at the top of the disperse phase zone, is an important factor in determining the sharpness of the separation which may be obtained. According to my invention, when separating very fine particles such as those whose terminal velocity is less than about 1 ft. per second in air, this outage must be at least 10 ft., and preferably 10–20 ft. or more.

Particles remaining entrained in the gas stream leaving the top of the fractionating zone 18 may be carried on up the elutriation tower through a second dispersion plate 21 into the next higher section 22. In this section the diameter of the column is increased so as to give a lower gas velocity for the amount of gas introduced through line 16 at the bottom of the tower. At this lower gas velocity, which may be further adjusted by means described below, particles somewhat smaller than those in the bottoms cut 19 are settled out. This portion of the solid remains supported on the dispersion plate 21 as a fluidized bed of particles 23 which can be drawn off as a side stream through valved line 24. In order to accomplish this the dispersion plate 21 is located at the top of the lower section 14 of the elutriator, before the diameter increases. The fluid bed 23 which is formed at the bottom of the second section 22 is formed in the expanding section 25, where the somewhat higher gas velocity and high turbulence cause rapid stripping of the lighter particles of solid which are carried off through section 22.

Operating with a fluid bed of solid above the dispersion plate in the elutriator has the advantage of giving better control of the stripping action in the elutriation and an easier removal of the product as a side stream cut. This bed level is kept low by a suitable continuous or periodic withdrawal of solid through line 24. The operation of the column may thus be made continuous or intermittent, by suitably controlling the feed of solids through line 13 and the withdrawal of product fractions.

The exact size range of the particles removed at 24 as a side stream cut from the elutriation tower is controlled by varying the velocity of the supporting gas in sections 14 and 22. The upper limit of this size range is determined by the velocity in section 14, since only the particles smaller than those removed as bottoms at line 20 are carried up into section 22. As a means of controlling the lower size limit of the side stream cut 24, and thus limiting the width of this cut, an auxiliary gas inlet 26 is provided at or near the bottom of section 22 so that the velocity of the supporting gas can be increased and brought as close to that in section 14 as may be desired.

The solid entrained overhead in the second elutriation zone 22 and carried on up through the column may be removed from the elutriator as such and recovered as a fines fraction. Side stream 24 then represents a single closely sized product fraction. On the other hand, the fines stream from this stage may be passed through a third and still other elutriation zones, as may be desired. In the drawing a third elutriation zone 30, similar to the second zone 22 but having a larger diameter, has been shown for purposes of illustration. In this zone 30, the velocity is again less than in the next lower zone 22. Thus the particles which settle out and come to rest on the dispersion plate 31 as a fluidized bed 32 of solid have a somewhat smaller particle diameter than those withdrawn from section 22 through line 24. These, in turn, are smaller than the particles in the bottoms cut. Two elutriation zones give one closely sized side stream, plus fines and bottoms cuts. Three elutriation zones give four product fractions, including two closely sized side stream cuts, and so on.

The elutriator may have still other elutriation zones, as desired. From the top zone the remaining stream of entraining gas and entrained solid may be used as such, as a suspension of the fines, or it may be treated in any suitable manner to recover a part or all of the entrained solid. This stream will contain all of the smallest size partices in the solid being processed. Thus, it may vary in solids content from nothing to a major portion of the solids being fractionated, depending upon whether the side stream cuts above the bottoms include all of the finest particles of the original or only the coarsest and selected intermediate fractions of the original size range.

The initial velocity of the supporting gas stream introduced below bed 19 and the relationship between velocities in the various elutriation zones is a major controlling variable in the operation of my invention. Basically, the upward velocity of the supporting gas employed in each zone of the elutriation process must be high relative to the free falling velocity of the free particles being separated therein, in order to obtain a satisfactory fractionating effect above the fluid beds in the elutriator. As described, it is also essential to operate with high outages, i. e. with a high free space in each section above the low level of the fluidized material separating out at the bottom of each zone. Characteristic velocities in handling many of the more common finely divided industrial solids are from 0.5 to 1 ft. per second or more above the free falling velocity of the individual particles concerned in the subsieve and finer sieve size ranges and the outages used in this case should be at least 10–20 ft. or higher in each zone.

EXAMPLE

The following data illustrate the results of the fractionating effect obtained when carrying out an elutriation at high gas velocities, with various outages.

The solid employed in these tests was a finely divided synthetic silica-alumina gel having a uniform particle density of about 81 lbs. per cu. ft., and a random size distribution including particles from about 0 to 80+ microns in diameter. Its approximate composition was 3% of 0/10 micron particles, 9% 10/20, 19%20/40, 17%40/60, 12% 60/80, and 40% of 80+ microns in diameter. This solid was introduced as a fluid bed of powder 1 ft. in depth at the bottom of a 4 inch I. D. column, together with an air stream passing upward at a superficial velocity of 1.5 ft. per second. The outage between the fluid bed level and the gas exit at the top of the column was varied in three separate runs to give a height to the disperse phase of 5 ft., 10.5 ft. and 21 ft. All solids were retained in the system, so as to keep the same overall size distribution throughout each run, by returning collected fines through an external dip leg directly into the fluid bed. The system came to equilibrium rapidly, recycling for a few minutes in each case to reach a steady state. The relative compositions of the material entrained from the top of the vessel under each of these conditions and the bottoms in equilibrium therewith are illustrated in the following table.

*Table*

| Disperse phase height | 5 ft. | 10.5 ft. | 21 ft. | Termiual Velocity, ft./sec.[1] |
|---|---|---|---|---|
| Entrainment, lbs./cu. ft. | 0.14 | 0.025 | 0.012 | ---------- |
| Composition of Overhead: | | | | |
| 0/10 micron fraction | 0.5 | 3.5 | 5.6 | 0.013 |
| 10/20 micron fraction | 13.3 | 17.4 | 61.4 | 0.052 |
| 20/40 micron fraction | 42.4 | 46.2 | 32.3 | 0.206 |
| 40/60 micron fraction | 31.5 | 26.2 | 0.6 | 0.465 |
| 60/80 micron fraction | 9.0 | 5.4 | 0.1 | 0.825 |
| 80+ micron fraction | 3.3 | 1.3 | 0.0 | above 1.0 |
| Composition of Bottoms: | | | | |
| 0/10 micron fraction | 0.2 | 1.0 | 0.4 | ---------- |
| 10/20 micron fraction | 1.0 | 0.6 | 0.0 | ---------- |
| 20/40 micron fraction | 6.8 | 6.0 | 6.7 | ---------- |
| 40/60 micron fraction | 13.0 | 18.4 | 16.0 | ---------- |
| 60/80 micron fraction | 16.6 | 19.2 | 17.5 | ---------- |
| 80+ micron fraction | 62.4 | 54.8 | 59.4 | ---------- |

[1] For largest particle in each size range.

While the compositions of the bottoms are substantially equivalent, the overhead analyses are not. In the 5 ft. fractionating zone substantial proportions, 43.8%, of 40+ micron material escaped, whereas with 21 ft. outage the 40+ was only 0.7% indicating very sharp separation.

It will be noted that the operating velocity of 1.5 ft./sec. is substantially above the velocity of free fall of the 40 to 80 micron material which was selectively rejected as it passed up the column.

While the height of the fractionating zone changes the sharpness of the cut obtained, the cut point for this sharp separation will be affected primarily by the gas velocity used.

These data also show that the total amount of solid entrained when sharp separation has been effected at the top of the long fractionating zone is only a fraction of that at a lower level. This indicates a high rate of solid reflux or a high "reflux ratio," which is in many ways analogous to that required for efficient fractional distillation. This reflux of solid particles returns to the fluid bed at the bottom of the elutriation zone directly through the entraining gas, and in direct contact with the entrained solids contained therein. The selective action of this shower or reflux of returning particles becomes apparent only when a very large proportion of the solids originally entrained out of the fluid bed into the disperse phase have been returned as reflux. Thus, the entrainment at the 21 ft. level is less than 10% of that at the 5 ft. level, a relatively short distance above the interface between the turbulent fluid bed and the disperse phase. Apparently the amount of entrainment at the 10.5 ft. level, while it is noticeably less than that at the bottom of the tower, is still too high for the necessary amount of reflux to have taken place.

Stated somewhat differently, the amount of material left in the disperse phase after the desired fractionation has been effected must be only a very small fraction of the amount in the fluid bed in the bottom of the elutriator. In the specific case illustrated, the fluid bed of gel particles has a density of about 35 lbs. per cu. ft. The amount of entrained material at the 10 ft. level is somewhat under 0.1% of this bed density, while the solid concentration in the disperse phase at the higher level where a sharp separation has been effected is less than 0.05% of that in the fluid bed.

As indicated above, the application of the process of my invention has been described first in the specific case where the particles of the finely divided solid have all the same density. This is true for a number of potential industrial applications. It would apply, for example, to the classification of various silicates, oxides, metals or other powders used as pigments, fillers, grinding and polishing agents or the like. In another important series of applications, it is desirable to separate finely divided material in the nature of mixed powders. In this case individual particles of the mixture may differ in density, as well as in particle diameter. Problems of this nature occur commonly in ore dressing or the beneficiation of a variety of minerals. They may be particularly important in the handling of finely divided catalysts or adsorbents where activity or selectivity is related to particle density.

For either powders of homogeneous composition or mixed powdered solids, the high velocity air classification method of the present invention may have important advantages over the sedimentation or water elutriation methods which are often employed for particle sizing. It can be used in handling materials which are water soluble or reactive with water, such as dehydrated solids. It is particularly useful in handling solids which tend to cohere on drying a wet powder, to form agglomerates of much larger size than the separate particles obtained in the water settling step. The air classification method is also useful at temperatures well above room temperature, or in confined atmospheres where the suspending and entraining gas may be chemically reactive or chemically inert for special treating problems.

A specific use of the elutriation process described herein which makes possible the separation of particles in a mixed solid feed according to density or chemical composition, by a combination of elutriation and sieving, is described in detail in the above-mentioned parent application, Serial No. 165,307. For the general case therein described, in which particle density varies from one part of the solid to another, it is necessary to consider more carefully the nature of the separation brought about by the elutriation process. This separation is actually based on the ratio of particle weight to particle diameter, and particles having the same weight to diameter ratio are separated out together. This separation is exactly the same as one according to particle weight or particle diameter in the special case where all particles present have the same density. However, it is more closely related to particle weight than to particle density where there is a random distribution of both densities and sizes. The combination process employing elutriation and sieving thus makes possible a separation according to particle weight per unit volume, or particle density, which can not be obtained by either method alone.

The success of this combination process depends upon the ability to get sharp separations at high feed rates in the elutriation stage. Such a process is useful, broadly, wherever it is desirable to separate particles of high density from particles of low density in a mixed solid powder. Thus it may be used to recover heavy mineral constituents from ores, or to discard heavy contaminants from any powdered material. Its application to the handling of gel catalysts depends upon the fact that many catalysts of this type tend to become more dense as they become less active, so that a process which permits selectively discarding the densest particles is useful in maintaining catalyst activity.

A particularly advantageous application of this invention may be found in handling a catalyst which has been carefully sized at some stage in its manufacture. Natural or synthetic clay-type adsorbent gel catalysts, for example, to be used in the form of a fluid bed for the treatment of conversion of hydrocarbons, may be sized so that the material passes substantially all through a 100 mesh screen, with a tolerance of 4–6% on 100 mesh and none retained on an 80 mesh screen in the finished product. Such a catalyst will contain particles mostly in the range between about 0 and 150 microns with a small amount of larger particles up to about 175 microns. When a used catalyst of this type is being processed, according to my invention, the critical separation at the bottom of the elutriation tower will be such as to permit the discard of all heavier particles, and the recovery of 80 to 100 mesh and finer material including particles having a low density and high activity relative to the average catalyst being processed.

When operating in this manner, the elutriation rate at the bottom of the elutriation tower can be controlled so as to effectively support the largest particles of low density, high activity catalyst remaining within the particle size range of the original fresh catalyst. The material thus removed overhead, which will include the heaviest low density particles still present in the partly spent catalyst, will be carried on up out of the bottom section of the tower as a dilute disperse suspension, along with all the lighter particles present. Under these conditions, any heavier particles coming out in the bottoms cut from the elutriation tower must be material of higher density or large aggregates of some sort differing materially in nature from the composition or physical condition of the fresh catalyst.

In the bottoms cut from the elutriation of such a pre-sized material, the additional principle may be applied that over-sized particles significantly larger than the original size range are undesirable. The appearance of such very large particles or aggregates may be due in part to the same causes which give rise to the formation of high density particles of any size. Thus, the contamination of catalysts with non-volatile material which is not removed in regeneration may cause a partial sintering of the surface which leads to catalyst agglomeration. Catalyst agglomerates formed for any reason may give rise to high density particles which undergo incomplete regeneration, becoming cemented together to give a particle of poor catalytic activity and high coke forming tendency. In addition to these factors in systems where internal insulation is used to line part of the conversion apparatus, parts of the insulating brick may be worn off by the circulating catalyst to appear as large particles in this size range of the partly spent material. Whatever the cause or causes which may be involved, this portion of the catalyst containing both high density and oversized particles has been found to have very poor catalytic activity relative to the circulating stream as a whole. Any oversize particles which drop out in the bottom elutriation zone can be discarded as such, therefore, along with heavy material having a particle size equal to or somewhat smaller than that of the largest fresh catalyst particles.

In my invention, particular attention is paid to the larger particles present for several reasons. In the first place, the removal of the coarsest dense material present in the partly spent catalyst increases fluidity of the total mass. Also, it is particularly profitable to remove the coarsest particles of low activity because of the effect of attrition. Attrition reduces the smaller particles present into fines, which may ultimately escape from the system along with the vent gas from a catalyst regeneration step. The coarser particles at the same time are brought down into the moderate-size range and oversize particles, even though they be of very poor catalytic activity, are brought down into the size range of the original catalyst by the same forces. For this reason, the removal of the coarsest dense particles is particularly advantageous in preventing their large volumetric contribution to the average composition of the total catalyst mass.

When operating to bring about the selective separation of a single bottoms fraction, on this principle, the system may consist of only a single elutriation section. The same principles are employed, using a superficial gas velocity considerably above the terminal velocity of the particles to be separated, with a tall settling zone to permit the necessary reflux of solid so as to obtain the sharp separation desired.

The same basic principles controlling the choice of elutriation velocities and outages for the process of my invention apply whether the successive stages are arranged one above the other in a single column, side by side in separate columns or in any other manner. In an elutriator such as that shown in the drawing all the gas streams pass upwards. The inlet line 13 feeding solids to the column is shown as entering the bottom section 14 just above the bed level or interface of bed 19. It is equally possible to introduce the solid feed to each succeeding zone of the elutriation column in a similar manner. Thus, the illustrative apparatus of the drawing might be modified by blanking off the column at the top of each of the lower fractionating zones, passing the dilute suspension from the top of zones 14 and 22 around the respective fluid beds 23 and 32 to enter as a side stream above the next higher bed level. In this case the additional gas supply introduced at lines 26 and 33 will also serve as a fluidizing medium for the solids in these beds. In any case the velocity of the supporting gas passing into each zone from all lower zones, including the bottom zone, decreases in direct proportion to the increase in cross-sectional area. Increased flexibility in the equipment can be obtained by designing the elutriator so as to give, at each stage, more of an increase in cross-sectional area than that which is required for usual operation, or enough of an increase in cross-section so as to provide the largest decrease in velocity which will be required in the operation of the column. The difference in velocity between successive zones is then adjusted by adding additional supporting gas to each stage, as described above, so that the difference in velocity is correspondingly less than that represented by the increase in cross-sectional area in the successive zones.

Having thus described my invention, the subject matter which I wish to cover is outlined more particularly in the following claims.

What is claimed is:

1. The method of effecting a sharp separation of smaller particles from larger particles in the same general size range according to the ratio of particle weight to particle diameter, in a finely divided solid containing particles of varying sizes which comprises maintaining a turbulent fluid bed of solid at the bottom of an elutriation column, feeding the finely divided solid thereto, passing a gas stream upwardly therethrough at a superficial velocity which substantially exceeds the free falling velocity of a portion of the particles therein by at least 0.5 feet per second, entraining solid particles into the disperse phase of solid above the fluid bed, passing said dispersion of entrained particles upward through a settling zone of at least 10 feet outage, the dispersion at the top of the settling zone having a density not greater than 0.1% of the fluid bed, and settling out therein a major portion of said entrained particles including particles having a free falling velocity substantially less than the superficial velocity of the entrained gas, returning said settled particles downward through said disperse phase as a reflux of solid particles, thereby selectively returning to the fluid bed the largest particles originally entrained into the disperse phase, and removing overhead from the settling zone a thin dispersion of the smaller particles of the original solid substantially free of the larger size components thereof.

2. The method according to claim 1 in which the finely divided solid consists of particles all having substantially the same particle density, and the separation effected is a separation according to particle diameter.

3. The method according to claim 1 in which the smaller particles removed overhead from the top of the settling zone have a free falling velocity of less than 0.5 ft. per second and in which the velocity of the entrained gas is about 1 ft. per second above the free falling velocity of the largest particles thus removed.

4. The method according to claim 1 in which the finely divided solid is separately fluidized and fed to the elutriation column as a side stream entering just above the level of the fluid bed therein, at the bottom of the tall settling zone.

5. The method according to claim 1 in which the concentration of solid particles at the top of the settling zone is less than 0.05% of the concentration of the solid in the fluid bed.

6. In a catalytic system for the conversion of hydrocarbon vapors using a circulating body of fluidized adsorbent catalyst wherein the original fresh catalyst charged to the system is a material of substantially uniform particle density which has been presized by sieving, the process of maintaining catalyst activity which comprises withdrawing an aliquot portion of the total circulating catalyst, passing this portion together with an upflowing entraining gas stream into an elutriation zone and maintaining in the bottom portion thereof a fluidized bed of catalyst particles while operating at a superficial entraining gas velocity at least 0.5 ft. per second greater than the free falling velocity of the largest particles in said presized fresh catalyst, passing said entraining gas upward through a relatively very tall settling zone, wherein at least 90% of the solid particles originally entrained above said fluid bed are settled out and returned thereto as a reflux of solid particles including the largest particles in said entrained material, maintaining a solids density in the upper part of said settling zone which does not exceed 0.1% of the apparent solids density of the bed in said elutriating zone, thereby selectively rejecting the largest particles in the portion of the catalyst fed to the elutriation zone, withdrawing from said elutriation zone a bottoms fraction comprising particles of low catalyst activity which are larger in weight per unit diameter together with particles larger in diameter than the largest particles in the original presized fresh catalyst, discarding said bottoms fraction and returning the lighter fraction from the elutriation process to the main body of said circulating catalyst.

7. Method according to claim 1 wherein the thin dispersion which is removed overhead is passed through another fluid bed and through another tall settling zone at slower velocity to separate a sharply defined intermediate cut of solid particles and a cut of finer particles carried overhead from said last mentioned settling zone.

8. In the elutriation of finely divided particles to separate larger particles from smaller particles of the same general size range, the improvement which comprises feeding said finely divided particles to the bottom portion of an elutriation column which includes a settling zone of at least 10 feet outage, passing a gasiform fluid upward therethrough at a superficial velocity of at least 0.5 feet per second above the free falling velocity of a portion of said finely divided particles therein, maintaining a relatively shallow turbulent bed of finely divided particles at the bottom of said elutriation column, entraining finely divided particles with the gasiform fluid as a disperse suspension into said settling zone above said turbulent bed, settling out therein a major portion of said entrained particles including particles having a free falling velocity substantially less than the superficial velocity of the entraining gasiform fluid, returning said settled particles downward through said settling zone as a reflux of solid particles so as to produce a thin dispersion of smaller particles at the top of said settling zone, withdrawing a portion of the finely divided particles from said turbulent bed, and removing overhead from said elutriation column said thin dispersion of the smaller particles of the original feed substantially free of the large size components thereof.

References Cited in the file of this patent

UNITED STATES PATENTS

| Number | Name | Date |
|---|---|---|
| 2,483,485 | Barr | Oct. 4, 1949 |
| 2,567,207 | Hoge | Sept. 11, 1951 |
| 2,631,968 | Peery | Mar. 17, 1953 |